US011123655B2

United States Patent
Srinivasan et al.

(10) Patent No.: US 11,123,655 B2
(45) Date of Patent: Sep. 21, 2021

(54) APPARATUS FOR PARALLEL ACCELERATED SOLVENT EXTRACTION

(71) Applicant: Dionex Corporation, Sunnyvale, CA (US)

(72) Inventors: Kannan Srinivasan, Tracy, CA (US); SM Rahmat Ullah, Fremont, CA (US)

(73) Assignee: Dionex Corporation, Sunnyvale, CA (US)

( * ) Notice: Subject to any disclaimer, the term of this patent is extended or adjusted under 35 U.S.C. 154(b) by 509 days.

(21) Appl. No.: 13/765,948

(22) Filed: Feb. 13, 2013

(65) Prior Publication Data
US 2014/0224732 A1 Aug. 14, 2014

(51) Int. Cl.
*B01D 11/02* (2006.01)
*G01N 1/40* (2006.01)
*G01N 30/00* (2006.01)

(52) U.S. Cl.
CPC ...... *B01D 11/0284* (2013.01); *B01D 11/0207* (2013.01); *G01N 2001/4061* (2013.01); *G01N 2030/009* (2013.01)

(58) Field of Classification Search
None
See application file for complete search history.

(56) References Cited

U.S. PATENT DOCUMENTS

| | | | | |
|---|---|---|---|---|
| 5,147,538 A | * | 9/1992 | Wright | B01D 11/0203 210/181 |
| 5,240,603 A | * | 8/1993 | Frank | B01D 11/0203 203/49 |
| 5,472,612 A | * | 12/1995 | Maxwell | B01D 11/0203 210/181 |
| 5,647,976 A | | 7/1997 | Rothe et al. | |
| 5,660,727 A | | 8/1997 | Gleave et al. | |
| 5,750,029 A | * | 5/1998 | Houck | B01D 11/0203 210/137 |
| 5,785,856 A | * | 7/1998 | Gleave | B01D 11/0203 210/175 |

(Continued)

FOREIGN PATENT DOCUMENTS

CN 201632088 U 11/2010
CN 104602780 B 6/2017

(Continued)

OTHER PUBLICATIONS

"Haskel Liquid Pumps Liquid Pumps ASF-150", Haskel.com, http://liquidpumpcatalog.haskel.com/ecatalog/liquid-pump-selector/en/ASF-150.*

(Continued)

*Primary Examiner* — Jason M Greene
*Assistant Examiner* — Eric J McCullough (57) ABSTRACT

A parallel accelerated solvent extraction system includes a plurality of extraction cells, a temperature controlled zone for maintaining the plurality of extraction cells at a desired temperature, a plurality of collection vessels, each fluidly coupled to a respective extraction cell via a flow restrictor configured to maintain a pressure, a solvent pump for supplying extraction solvent to the plurality of extraction cells, and a switching valve for sequentially directing extraction solvent flowing from the solvent pump to respective ones of the plurality of extraction cells. A method of parallel accelerated solvent extraction is also disclosed.

25 Claims, 2 Drawing Sheets

(56) References Cited

U.S. PATENT DOCUMENTS

| | | | |
|---|---|---|---|
| 5,843,311 A * | 12/1998 | Richter | B01D 11/0203 210/634 |
| 6,911,151 B1 * | 6/2005 | Muller-Kuhrt | B01D 15/1885 210/103 |
| 9,440,166 B2 | 9/2016 | Srinivasan et al. | |
| 10,571,374 B2 | 2/2020 | Srinivasan et al. | |
| 10,746,639 B2 | 8/2020 | Srinivasan et al. | |
| 2004/0038384 A1 * | 2/2004 | Dussauze | B01D 15/00 435/287.1 |
| 2008/0124251 A1 * | 5/2008 | Chen | G01N 1/40 422/400 |

FOREIGN PATENT DOCUMENTS

| | | |
|---|---|---|
| EP | 2890469 A2 | 7/2015 |
| WO | 9625213 A1 | 8/1996 |
| WO | 2014036376 A3 | 3/2014 |

OTHER PUBLICATIONS

"ASF-150 Datasheet—Haskel International LLC—ASF Series Pneumatic Driven Liquid Pumps_IHS Engineering360", IHS Engineering360, Globalspec.com, http://datasheets.globalspec.com/ds/1263/HaskelInternational/495034F8-EECE-4C6C-BF11-F5D1D7681788.*

"Liquid." Dictionary.com. Dictionary.com, n.d. Web. Jan. 24, 2017.*

U.S. Appl. No. 13/599,837, filed Aug. 30, 2012, to Srinivasan.

Matricardi, M. et al. "Effect of Operating Conditions on Static / Dynamic Extraction of Peanut Oil Using Supercritical Carbon Dioxide." (2002).

Kamali et al., "The Optimization of Essential Oils Supercritical CO2 Extraction from Lavandula Hybrida Through Static-Dynamic Steps Procedure and Semi-continuous Technique Using Response Surface Method" Pharmacognosy Research, Jan.-Mar. 2015, vol. 7, Issue 1, pp. 57-65.

Marz, Stephen, "Controlling Water Hammer and Hydraulic Shocks with Passive Control", www.machinedesign.com, Oct. 4, 2016, 5 pages.

* cited by examiner

APPARATUS FOR PARALLEL ACCELERATED SOLVENT EXTRACTION

BACKGROUND OF INVENTION

Field of Invention

This application relates, in general, to apparatuses for parallel accelerated solvent extraction and methods for use.

Description of Related Art

Accelerated solvent extraction is a technique for extracting solid and semisolid samples with liquid solvents. Accelerated solvent extraction utilizes increased temperature and pressure with common solvents to increase the efficiency of the extraction process. Accelerated solvent extraction can be used to replace more conventional Soxhlet, sonication, boiling, wrist-shaker, and other extraction methods. Several ASE systems are currently offered by the Dionex Corporation including the ASE® 150 Accelerated Solvent Extractor and the ASE® 350 Accelerated Solvent Extractor.

Accelerated solvent extraction methods performed by the ASE® extractors are accepted solid liquid extraction (SLE) methods useful for extraction of many types of analytes. As used herein the term "ASE" refers to an accelerated solvent extraction method such as performed by the ASE® system and to the system itself. One such method is described in U.S. Pat. No. 5,843,311 ("the '311 patent") and in EPA Method 3545. An automated system for performing an ASE method is described in U.S. Pat. No. 5,785,856 ("the '856 patent").

With accelerated solvent extraction, the sample is generally first ground and/or mixed with a dispersing agent. A weighed portion is placed in a stainless steel extraction cell, which is then heated to a predetermined temperature. Initially, a conventional static valve is opened and solvent is pumped into the extraction cell and through the static valve to a collection vial. Once a desired quantity of solvent reaches the collection vial, the static valve is closed and a high pressure pump continues to fill the extraction cell with solvent until a target pressure is achieved within the extraction cell. Target pressures often are in excess of 1500 psi.

Generally, accelerated solvent extraction systems are configured for sequential extractions, that is, one extraction at time. Parallel extraction systems have been pursued, however, such systems have met with several issues in which disadvantages have outweighed the benefits of parallel extractions.

For example, a single pump may be used with flow splitters to form parallel flow paths across several extraction cells, however, such flow splitting generally results in flow variations between the various extraction cells. The net result is the collected extracts from the extraction cells vary in volume and in concentration resulting in variations in overall performance of such parallel processing. Accordingly, the benefit of parallel extraction is negated by such flow splitting configurations.

A single pump may also be used to fill individual cells and pursue extraction in a static mode of operation, however, such operation is not true parallel processing. Accordingly, actual throughput is more akin to sequential processing and not equal to the increased throughput that parallel processing may provide.

Alternatively, multiple pumps may be used with a corresponding number of extraction cells to provide a true parallel approach, however, such duplicity adds costs directly proportional to the number of pump/cell channels.

Therefore there is a need for a more cost effective means of pursuing parallel extractions without any of the above limitations and disadvantages.

BRIEF SUMMARY

One aspect of the present invention is directed to a parallel accelerated solvent extraction apparatus including a plurality of extraction cells, a temperature controlled zone for maintaining the plurality of extraction cells at a desired temperature, a plurality of collection vessels, each fluidly coupled to a respective extraction cell via a flow restrictor configured to maintain a pressure, a solvent pump for supplying extraction solvent to the plurality of extraction cells, and a switching valve for sequentially directing extraction solvent flowing from the solvent pump to respective ones of the plurality of extraction cells.

The temperature controlled zone may be a water bath. The temperature controlled zone may be an oven assembly. The temperature controlled zone may include a dedicated control zone for each extraction cell. The temperature controlled zone may maintain the plurality of extraction cells at 100° C.

The flow restrictor may be a restrictor tube providing constant fluid communication between respective ones of the extraction cells and the collection vessels.

The solvent pump may operate at 1500 psi or more.

The switching valve may be a multi-port valve or a multi-position valve. The switching valve may be a six-port valve or a ten-port valve. The switching valve may be a six-position valve or a ten-position valve. The switching valve may be automatically controlled to sequentially switch between the plurality of extraction cells.

Another aspect of the present invention is directed to a method for parallel accelerated solvent extraction including providing a plurality extraction cells, providing a plurality of samples, placing each sample in a respective one of the extraction cells, maintaining an operating temperature of the plurality of extraction cells at the desired temperature, supplying extraction solvent to the plurality of extraction cells, and sequentially directing extraction solvent from the solvent pump to a selective one of the plurality of extraction cells, wherein the solvent passes through the selective one the extraction cell.

The temperature controlled zone may maintain the extraction cells at 100° C.

A flow restrictor may provide constant fluid communication between respective ones of the extraction cells to a corresponding plurality of collection vessels.

The supplying extraction solvent step may be accomplished with a solvent pump. The solvent pump may operate at 1500 psi or more.

The sequentially directing extraction solvent step may be accomplished at predetermined sequential intervals. The sequentially directing extraction solvent step may be accomplished with a switching valve. The switching valve may be a multi-port valve or a multi-position valve. The switching valve may be automatically controlled to sequentially switch between the plurality of extraction cells.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Generally, the present invention provides for pursuing accelerated solvent extraction in a parallel format with a single pump configuration. In accordance with the present invention, a parallel accelerated solvent extraction system uses valve switching to route the solvent output from a pump into a plurality of extraction cells, for example, 2, 4, 6 or more in number, in a switching fashion thereby maintaining flow rate and providing reproducible extraction results. Due to the use of a single pump the solvent extracts achieve reproducible volume making the extracted analyte concentrations consistent in the parallel format. In various embodiments, due to the use of a single positive displacement pump, a parallel accelerated solvent extraction system in accordance with the present invention allows for a more reproducible format for pursuing parallel extraction at a lower cost.

Figure 1:
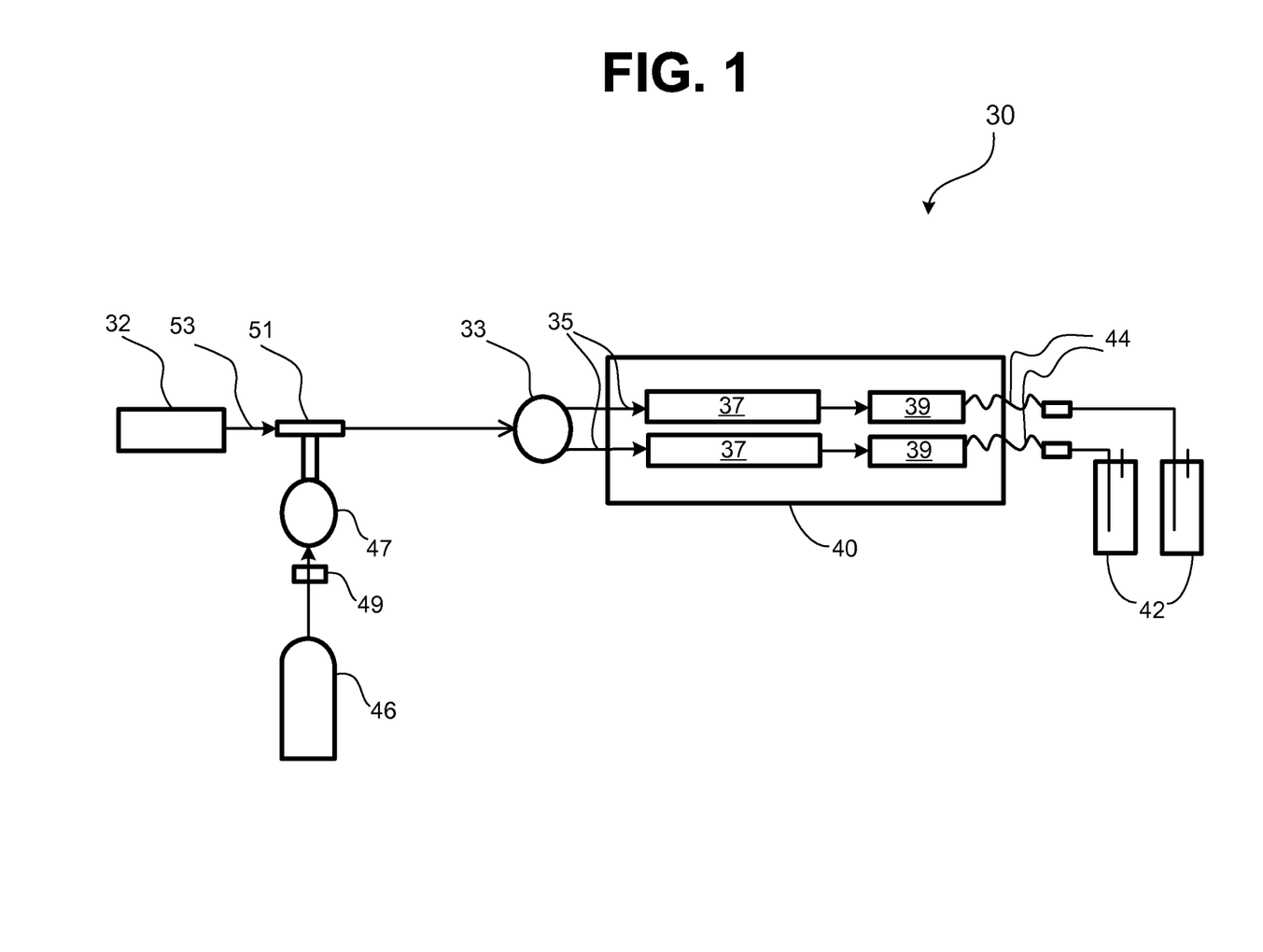
FIG. 1 is a schematic view of an exemplary parallel accelerated solvent extraction system having two channels in accordance with various aspects of the present invention.

Turning now to the drawings, wherein like components are designated by like reference numerals throughout the various figures, attention is directed to FIG. 1, which illustrates a parallel accelerated solvent extraction system, generally designated 30. The illustrated system uses a single solvent pump 32 and a switching valve 33 to selectively divert the output from the pump to a plurality of extraction channels 35 in order to pursue parallel extraction. As illustrated in FIG. 1, the extraction channel 35 includes a solvent cell 37 and a sample cell 39. It should be noted the term cell and column may be used interchangeably in describing the solvent extraction systems described herein. The term column can be used to describe a cell that has an approximately cylindrical shape.

The pump operates continuously at a set flow rate and is able to pump in known metered volumes of the solvent into the extraction channels. By precisely controlling the flow rate, the volume of the extract is precisely controlled. Pursuing accelerated solvent extraction in such a controlled fashion provides for a more reproducible platform of pursuing parallel extraction using accelerated solvent extraction. One will appreciate that such singular pumping methods can also be used in a system with a gas assisted mode of operation.

In some aspects, the systems and methods of the present invention are similar to those disclosed by the above mentioned '311 and '856 patents, as well as those described in U.S. Pat. Nos. 5,647,976 and 5,660,727, the entire content of which patents is incorporated herein for all purposes by this reference.

As shown in FIG. 1, the extraction system generally includes a solvent pump 32 fluidly connected by switching valve 33 to a plurality of solvent columns 37 and corresponding sample columns 39 forming a plurality of channels housed in a temperature controlled zone 40. It should be noted that one or more temperature controlled zones may constitute zone 40. The columns of each channel are fluidly connected to respective collection vessels 42 via a corresponding number of flow restrictors 44. The flow restrictors generally add a backpressure to the cell during extraction. For example, a flow restrictor may be formed of a tubing that is heated as desired. Other flow restrictors may include a valve that closes and opens at a set pressure and/or set time.

The solvent pump may be a Dionex P680 HPLC Pump manufactured by Thermo Fisher Scientific (Sunnyvale, Calif.), however, one will appreciate that other suitable pumps may be utilized in accordance with the present invention. Preferably, the flow rate is from 0.001 to 100 mL/min; more preferably 0.001 to 40 mL/min and most preferably 0.5 to 10 mL/min. Preferably, the pressure range is about 5000 psi or less, more preferably from 5 psi to 1000 psi and most preferably 10 psi to 100 psi.

The temperature controlled zone may be a water bath of the type provided by Thermo Fisher Scientific of Waltham, Mass., however, one will appreciate that other suitable temperature controlled devices may be utilized in accordance with the present invention. Preferably the temperature is above ambient and as high as 200 C. It should be noted that individual heaters may be provided and/or operated with each solvent and/or sample cell. In this configuration the individual cells could be operated at different extraction temperatures. Thus it is feasible to obtain the benefit of parallel extraction even when the extraction conditions are different.

The solvent and sample columns or cells may be of the type provided by Isolation Technologies, IDEX Health and Science of Middleboro, Mass., however, one will appreciate that other suitable columns or cells may be utilized in accordance with the present invention.

The suitable columns or cells are preferably made of stainless steel, titanium, zirconium and the like. The columns would conduct heat from an external heat source. It is also conceivable to use a preheat source to heat the solvent such as using a solvent column or cell or an enclosure that heats the solvents such as stainless steel tubing or the like. Typically the solvent column volume is determined from the sample cell size. For analytical applications the volume ranges from about 1 to 100 mL. The cell sizes used for extraction can be proportional to the sample size used. For example 30 g of a soil sample can be used with a 100 mL cell. The solvent column volume is also proportional to the cell size in use. The solvent column may be eliminated in some applications, in which case, the solvent may be heated via the sample cell walls.

A gas cylinder 46 may be operably connected to a purge valve 47 to regulate gas flow. The gas cylinder may be a nitrogen ($N_2$) gas cylinder, for example, an Airgas-NCN cylinder by Airgas of Sacramento, Calif., however, one will appreciate that other suitable gases or gas cylinders may be utilized in accordance with the present invention. In various embodiments, the purge valve is a six-port valve, for example, a Rheodyne model 7010 six-port valve from Upchurch Scientific/IDEX Corp of Oak Harbor. One will appreciate that other suitable means may be utilized to regulate gas flow. Nitrogen gas may be used to purge the fluid lines, in which $N_2$ flow is offline during extraction and inline during $N_2$ purge. A check valve 49 may be connected in between the purge valve and the $N_2$ cylinder to prevent the back flow. For example, a CV-3001 check valve inline cartridge and a U-469 cartridge holder provided by Upchurch Scientific/IDEX Corp. of Oak Harbor, Wash., or other suitable check valve means may be utilized. This six-port valve is inline only during nitrogen purge.

The $N_2$ flow line may be connected after from the purge valve to a three-way tee connector 51 establishing fluid communication with a solvent line 53 that provides solvent from solvent pump 32 to switching valve 33 to selectively direct solvent flow to one of extraction channels 35. In such an embodiment, $N_2$ gas from cylinder 46 can mix with the liquid solvent at three-way connector 51 to form a gas/liquid solvent mixture that is inputted into the extraction channel. The gas may combine with the liquid solvent at a pressure of about 60 psi. In various embodiments, the switching valve is a multi-port valve or a multi-position valve depending on the extraction channels used. For example, a six-port valve may be controlled automatically and actuated each minute to switch the solvent flow from one channel to another. Alternatively a six-position valve may be controlled manually to switch the solvent flow from one channel to another. Alternatively, a 10-port or 10 position valve may be utilized in order to increase the number of extraction channels if so desired. One will appreciate that various switching valves or other suitable means may be utilized in accordance with the present invention. One will appreciate that it the switching valve may be integrated with the pump so that the solvent could be switched in a more seamless fashion. In this configuration each extraction line would be in fluidic contact with a gas purge line.

In various embodiments, the outlets of switching valve 33 are connected to respective solvent columns or cells 37. For example, the outlets of the switching valve are fluidly coupled with a respective stainless steel solvent column of the type provided by Isolation Technologies/IDEX Health and Science of Middleboro, Mass. In the illustrated embodiment, the solvent column or cell is 4.6 mm×250 mm having a volume of 4.15 mL, however, one will appreciate that a variety of columns or cells or enclosures may be utilized depending upon the sample size, (e.g., 1 mL, 5 mL, 10 mL, 22 mL, 34 mL, 66 mL, 100 mL, etc.). Other means of heating the solvent may be used as long as the solvent is hot during the extraction step. For example, the solvent may be preheated before entering the pump.

Each solvent column or cell 37 within each extraction channel 35 is fluidly connected to a respective sample column or cell 39. For example, each solvent column may be fluidly coupled with a stainless steel column of the type also provided by Isolation Technologies/IDEX Health and Science of Middleboro, Mass. In the illustrated embodiment, the sample columns are 78 mm×75 mm having a volume of 3.58 mL, however, one will again appreciate that a variety of columns may be utilized as is the case with the solvent columns above. Stainless steel tubing (e.g., 0.03 inch I.D.) may be used to connect the columns. One will appreciate that other suitable fluid lines may be utilized in accordance with the present invention.

The solvent column or cell 37 and the sample column or cell are housed in temperature controlled zone 40. In various embodiments, a thermo-stated water bath may be utilized to maintain the temperature controlled zone at a desired temperature. For example, columns may be submerged in a water bath at 100° C. One will appreciate that other suitable means may be utilized to maintain the temperature of the columns, including, but not limited to a localized oven assembly of the type found in the above-mentioned ASE® 150 and 350 Accelerated Solvent Extractors.

An extract collection vessel 42 is fluidly coupled with the sample column 39 of each extraction channel 35 downstream of temperature controlled zone 40. In the illustrated embodiment, the collection vessels are 250 mL collection bottles of the type provided by Dionex of Sunnyvale, Calif. One will appreciate, however, that one may utilize other suitable collection vessels, including but not limited to, 60 mL collection vials of the type sold by Thermo Fisher Scientific (Sunnyvale, Calif.).

Each extraction channel is connected with a flow restrictor 44 fluidly coupling the respective collection vessels to the corresponding sample column. In various embodiments, the flow restrictors may be restrictor tubes fluidly coupling an outlet of each sample column to a corresponding collection bottle in order to generate sufficient backpressure to increase the residence time of the solvent in the sample column. For example, stainless steel tubing having 0.01 inch I.D.×3.93 inch length and red PEEK tube having 0.005 inch I.D.×6-12 inch length may be utilized to generate backpressures of approximately 70-88 psi at 2-4 mL/min of solvent flow. A purpose of the backpressure is to keep the solvent from boiling at a set temperature. The backpressure can be adjusted via a restrictor tube or via a suitable valve. The valve can be opened or closed at a set pressure. Typical values of backpressure range from 10 psi to 2000 psi. The flow restrictors can be temperature controlled to achieve a set temperature for the extracted solvent.

One will appreciate that the collection vessel may be eliminated if the extracted solvent is routed to an analysis system. For example each extraction channel can be connected to the injection systems of a Gas Chromatograph or a Liquid Chromatograph system for inline analysis.

One will appreciate that other suitable flow restrictors may be utilized to generate desired backpressure, flow and temperature parameters in accordance with the present invention.

Figure 2:
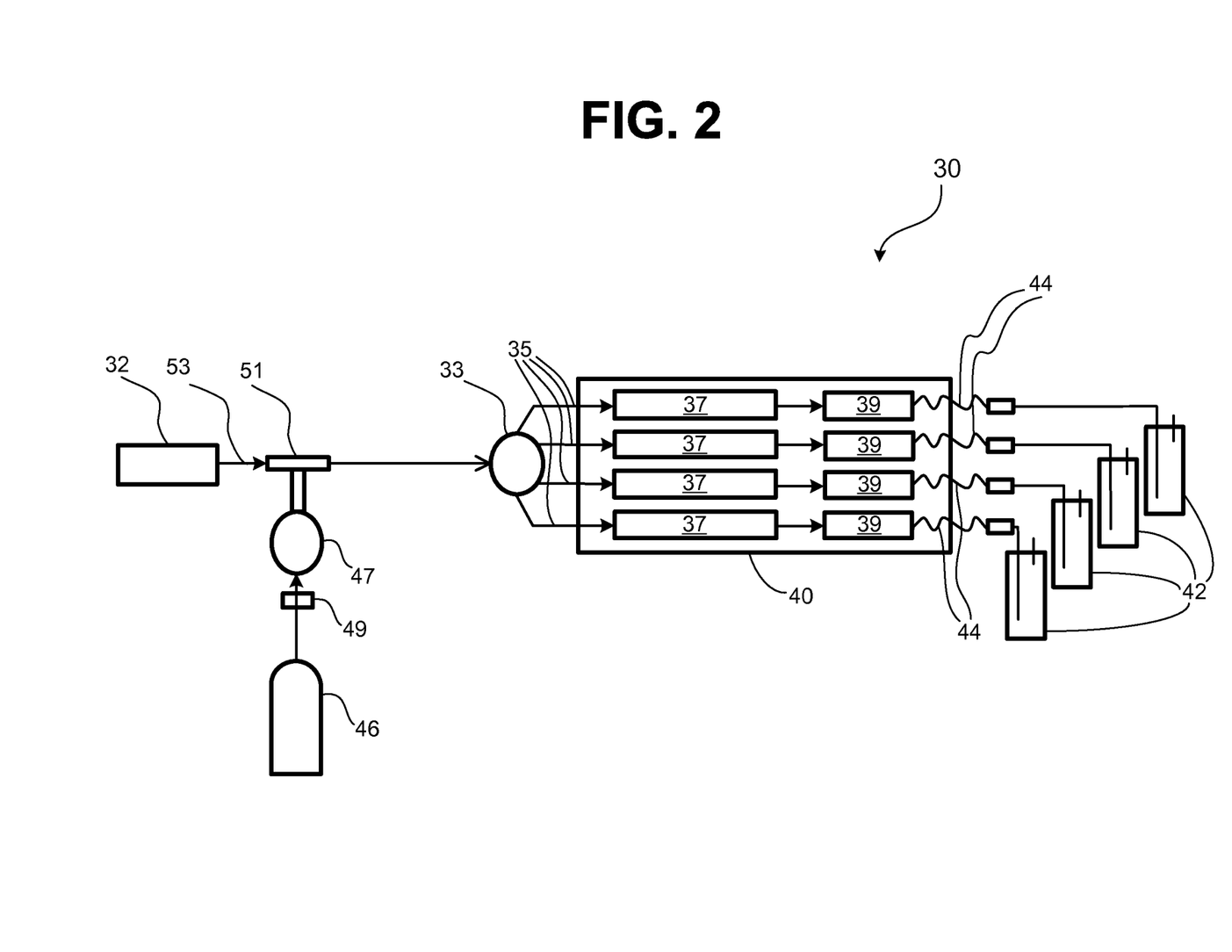
FIG. 2 is a schematic view of an exemplary parallel accelerated solvent extraction system having four channels in accordance with various aspects of the present invention.

In various embodiments, parallel extraction may be pursued with a plurality of extraction cells (see, e.g. FIG. 2) using gas assistance a manner similar to that described in U.S. patent application Ser. No. 13/599,837, filed Aug. 30, 2012 and entitled METHOD AND DEVICE TO EXTRACT AN ANALYTE FROM A SAMPLE WITH GAS ASSISTANCE, the entire content of which is incorporated herein for all purposes by this reference. The methods and apparatus of solid liquid extraction apparatus described herein (see, e.g. FIG. 2) may include a means of moving a mixture of a liquid solvent and a gas to the sample container without splitting the solvent and gas mixture. In accordance with the present invention, a parallel accelerated solvent extraction system may use valve switching to route both the solvent output from a pump and a gas into a plurality of extraction cells, for example, 2, 4, 6 or more in number, in a switching fashion thereby maintaining flow rate of solvent-gas mixture and providing reproducible extraction results.

The following will describe a low cost extraction system that can process a relatively large number of samples in a short period of time by using parallel processing. The solvent extraction systems described herein include a switching valve that periodically switches the solvent flow from a single pump to the extraction channels. Surprisingly, Applicant found that filling each channel with solvent in a time sequential basis was beneficial in aiding faster solvent equilibration and higher extraction recoveries. Further, since a single pump with a fixed flow was used with a uniform solvent switching time interval, the collected solvent volume was about the same for each of the extraction channels. In contrast to a continuous solvent flow though an extraction channel, an intermittent delivery of smaller solvent aliquots allowed for faster equilibration time to the predetermined extraction temperature and extracted the compounds more efficiently. Further, by bringing in fresh aliquots of the solvent by the continuous valve switching operation, the partitioning of the analytes from the sample into the fresh solvent is favored. Since the switching valve is constantly switching the flow of the solvent from one channel to another, by definition, there is a static extraction time that is the time in which the solvent is quiescent and not flowing through the cell. The valve switching itself with a 6 port valve and a 6 position valve is fast with switching times typically between 100 to 250 milliseconds. Note that the time to switch the valve itself did not impact the extractions since this was a small portion of the static extraction time and the total extraction time.

The static extraction time in the simplest case is the product of the pumping time T and the number of extraction channels "n" minus 1 (i.e., static extraction time=(n−1)×T). For example, a 3-channel extraction can be performed where the solvent is switched to a different channel every 2 minutes. As such, "n" is 3 based on the number of extraction channels and the pumping time T is 2 minutes for a channel. In this example, one cycle of the extraction process would be 6 minutes (i.e., 3 channels×2 minutes). Thus, the static extraction time for one cycle is 4 minutes based on the values n=3 and T=2 minutes. In an embodiment, the static extraction time may range from about 0.1 minute to about 1 hour, and preferably range from about 1 minute to about 5 minutes.

Exemplary methods of how the parallel accelerated solvent extraction system may be used in accordance with the present invention will now be described.

Various analytical grade reagents may be used. For example, ACS grade hexane (Sigma-Aldrich, St. Louis, Mo.), ACS grade dichloromethane (Sigma-Aldrich, St. Louis, Mo.), HPLC grade methanol (Honeywell Burdick and Jackson, Muskegon, Mich.), and other suitable reagents may be used as extraction solvents.

In various trial runs, a food sample was analyzed (Similac® Advance infant formula from Abbot Laboratories of Columbus, Ohio). To prepare the sample, 0.7-1.0 g ASE® Prep Diatomaceous Earth (DE) (Thermo Scientific, Sunnyvale, Calif.) was ground and added to a mortar. Then the food sample (usually 0.7-1.0 g) was weighed to the nearest 0.0001 g in a weighing pan. The ratio of DE to sample was roughly 1:1 or higher. The sample was added into the mortar and ground thoroughly by pestle. A bottom frit and end cap were fixed for a sample column or cell 39, and the sample and dispersant were loaded in the sample column while tapping the sample column to ensure compact loading of the cell. A small amount of DE was added into the mortar and ground by pestle to rinse out the residual sample. This mixture was loaded into the same sample column. The top frit and end cap was fixed for the sample column.

The temperature controlled zone, in this case, a water bath was thermally equilibrated to a set extraction temperature of 100° C. Solvent pump 32 was primed using the extraction solvent. Each sample column 39 was attached to an extraction channel 35. The solvent pump was turned on at a desired extraction flow rate. The solvent was directed to the extraction channels in each minute sequentially at a desired flow rate. The six-port valve was controlled automatically by Chromeleon® (Thermo Scientific, Sunnyvale, Calif.) to select between extraction channel-1 (sample-1) and extraction channel-2 (sample-2) to deliver solvent flow for each minute while using two channels for extraction. Six-position valve 33 was controlled manually to select between channel-1, channel-2, channel-3 or channel-4 to deliver solvent flow for each minute while using four channels for extraction (see, e.g., FIG. 2). Solvent pump 32 was turned off after desired extraction time. Nitrogen flow (100 psi, 4 min for each channel) was used to push the solvent to the collection bottle. Nitrogen flow was added to the extraction channels in each minute sequentially by similar mechanism as the solvent addition during nitrogen purge. The extracts were collected into respective 250 mL collection bottles. The solvent was evaporated and the remaining lipid was measured gravimetrically.

Example 1

A preferred two channel parallel setup of the present invention was used in this experiment. A Similac® sample was prepared and loaded into the extraction cells. The water bath was set to 100° C. which was the extraction temperature. A solvent mixture comprising of Hexane: Dichloromethane (DCM): Methanol in a 5:2:1 ratio was used for the extraction purpose. The solvent was directed to the extraction channels with a pump flow rate of 3 mL/min. The solvent was added to the channels sequentially in one minute intervals causing the individual channel effective flow rate to be 1.5 mL/min. The total extraction time was for 10 minutes. A nitrogen purge was used after the extraction was complete, which was for 4 minutes for the two cells. The collected solvent was evaporated to dryness and the container was weighed. The recovery % was determined gravimetrically. Excellent recovery was achieved in the parallel mode as evident from the 100% lipid recovery (%) in the two cells (see Table 1 below).

TABLE 1

| Solvent flow rate, mL/min | Extraction time, min | Mode | Parallel samples | Lipid recovery, % | Solvent collected, mL |
|---|---|---|---|---|---|
| 3.0 | 10 | Automatic control of a 6 port switching valve | Sample-1 | 101.1 | 13 |
|  | 10 |  | Sample-2 | 101.4 | 13 |

Example 2

In this Example, a different solid sample was tested for lipid recovery using the parallel setup of Example 1. The sample was a cake mix from Pillsbury Company, Minneapolis, Minn. The sample was prepared and loaded into the extraction cells. The conditions were identical to that of Example 1.

Excellent recovery was achieved in the parallel mode as evident from the good lipid recovery (%) in the two cells (see Table 2 below).

TABLE 2

| Solvent flow rate, mL/min | Extraction time, min | Mode | Parallel samples | Lipid recovery, % | Solvent collected post extraction, mL |
|---|---|---|---|---|---|
| 3.0 | 10 | Automatic control of a 6 port switching valve | Sample-1 | 99.11 | 13 |
|  | 10 |  | Sample-2 | 98.47 | 13 |

Example 3

In this Example, a different solid sample was tested for lipid recovery using the parallel setup of Example 1. The sample was a parmesan cheese sample from Kraft Foods, Northfield, Ill. The sample was prepared and loaded into the extraction cells. The conditions were identical to that of Example 1 except a solvent composition of Hexane: Isopropanol in a 3:2 ratio was used for the extraction. Excellent recovery was achieved in the parallel mode as evident from the good lipid recovery (%) in the two cells (see Table 3 below)

TABLE 3

| Solvent flow rate, mL/min | Extraction time, min | Mode | Parallel samples | Lipid recovery, % | Solvent collected post extraction, mL |
|---|---|---|---|---|---|
| 3.0 | 10 | Automatic control of 6 port switching valve | Sample-1 | 98.65 | 14 |
|  | 10 |  | Sample-2 | 97.92 | 14 |

Example 4

In this Example, a four channel parallel setup of the present invention was used. A Similac® sample was prepared and loaded into the extraction cells. The water bath was set to 100° C. which was the extraction temperature. A solvent mixture comprising of Hexane: Dichloromethane (DCM): Methanol in a 5:2:1 ratio was used for the extraction purpose. The solvent was directed to the extraction channels with a pump flow rate of 4 mL/min. The solvent was added to the channels sequentially in one minute intervals with the individual channel effective flow rate being 1.0 mL/min. The total extraction time was for 20 minutes. A nitrogen purge was used after the extraction was complete, which was for 4 minutes for the four cells. The collected solvent was evaporated to dryness and the container was weighed. The recovery % was determined gravimetrically. Excellent recovery was achieved in the parallel mode as evident from the good lipid recovery (%) in the four cells (see Table 4 below).

TABLE 4

| Solvent flow rate, mL/min | Extraction time, min | Mode | Parallel samples | Lipid recovery, % | Solvent collected, mL |
|---|---|---|---|---|---|
| 4.0 | 20 | Manual control of the switching valve | Sample-1 | 101.2 | 18 |
|  | 20 |  | Sample-2 | 101.3 | 17 |
|  | 20 |  | Sample-3 | 100.9 | 18 |
|  | 20 |  | Sample-4 | 101.4 | 17 |

Example 5

In this Example, a parallel extraction of a Similac® sample was pursued using 4 channels and gas assistance. It should be noted that the liquid solvent and gas were combined together to form a mixture that was directed to the extraction channel to extract the sample with gas assistance. A Similac® sample was prepared and loaded into the extraction cells. The water bath was set to 100° C. which was the extraction temperature. A solvent mixture comprising of Hexane: Dichloromethane (DCM): Methanol in a 5:2:1 ratio was used for the extraction purpose. The solvent mixture and gas were combined at the 3-way valve 51 and directed to the extraction channels with a liquid pump flow rate of 2.4 mL/min and a nitrogen pressure gas of about 60 psi. The solvent was added to the channels sequentially in one minute intervals with the individual channel effective flow rate being 0.6 mL/min. A lower flow rate was used with gas assistance since the addition of the gas allows an overall reduction in solvent usage. The total extraction time was for 20 minutes. A nitrogen purge was used after the extraction was complete, which was 8 minutes for the four cells. The collected solvent was evaporated to dryness and the container was weighed. The recovery % was determined gravimetrically. Excellent recovery was achieved in the parallel gas assistance mode as evident from the good lipid recovery (%) in the four cells (see Table 5 below). When the solvent usage was compared with the previous Examples, the solvent usage in this Example was lower. Note that the solvent usage was about 15 to 20 mL per channel in Examples 1 to 4, and that the solvent usage was about 12 mL per channel (2.4 mL×20 min/4 channels) in this Example.

TABLE 5

| Solvent flow rate, mL/min | Extraction time, min | Mode | Parallel samples | Lipid recovery, % | Solvent collected post extraction, mL |
|---|---|---|---|---|---|
| 2.4 | 20 | Manual control of 6 position valve | Sample-1 | 101.0 | 11 |
|  | 20 |  | Sample-2 | 101.5 | 10 |
|  | 20 |  | Sample-3 | 100.6 | 10 |
|  | 20 |  | Sample-4 | 101.1 | 11 |

Example 6

This Example was performed in a parallel setup with two independent pumps and two channels. In this Example, a switching valve was not used to direct aliquots of solvent to the two channels in an alternating manner. A Similac® sample was prepared and loaded into the extraction cells (n=2). The temperature controlled zone was set at 100° C., and a solvent mixture comprising of Hexane: Dichloromethane (DCM): Methanol in a 5:2:1 ratio was used for the extraction. The pump flow rate was set to 0.6 mL/min. The extraction was pursued for 30 minutes in one experiment and for 20 minutes in a second experiment. In each experiment, Sample-1 and Sample-2 represented the two portions of Similac® samples within two respective extraction channels of the instrument. The nitrogen purge used was 2 minutes for each cell. The lipid recovery (%) as shown in the Table 6 below was in the 80 to 90% regime. The longer extraction time of 30 minutes showed a relatively higher recovery than the 20 minute extraction time. However, the lipid recovery % was relatively poor for both extraction times because a preferred lipid recovery % or extraction % should be about 95% or greater.

TABLE 6

| Solvent flow rate, mL/min | Extraction time, min | Mode | Parallel samples | Lipid recovery, % | Solvent collected, mL |
|---|---|---|---|---|---|
| 0.6 | 30 | Continuous flow | Sample-1 | 87.50 | 16 |
| 0.6 | 30 | Continuous flow | Sample-2 | 90.30 | 16 |
| 0.6 | 20 | Continuous flow | Sample-1 | 80.00 | 11 |
| 0.6 | 20 | Continuous flow | Sample-2 | 82.20 | 11 |

Example 7

This Example was performed in a split flow parallel extraction setup where the pump flow was split using a splitting "T" junction. Similar to Example 6, a switching valve was not used to direct aliquots of solvent to the two channels in an alternating manner. It should also be noted that gas assistance was not used in this Example. A Similac® sample was prepared as before using the two cells. The temperature controlled zone was set at 100° C. A solvent mixture comprising of Hexane: Dichloromethane (DCM): Methanol in a 5:2:1 ratio was used for the extraction. The pump flow rate was set to 1.2 mL/min. The parallel system described here used a single pump but with split flow. The total extraction time was set to 30 minutes. The nitrogen purge used was 2 minutes for both cells. The lipid recovery % in this approach was also in the 92% regime well below a preferred recovery of 100%. Note that the solvent collected in the two cells were different by about 5 milliliters due to the difficulty in ensuring that the split ratio was identical in the setup of this Example.

TABLE 7

| Solvent flow rate, mL/min | Extraction time, min | Mode | Parallel samples | Lipid recovery, % | Solvent collected, mL |
|---|---|---|---|---|---|
| 1.2 | 30 | Continuous splitting flow | Sample-1 | 92.10 | 14 |
|  | 30 |  | Sample-2 | 92.20 | 19 |

Example 8

This Example shows a parallel mode using a single pump and a switching valve as per the present invention. A Similac® sample was prepared and loaded into the extraction cells (n=2). The temperature controlled zone was set at 100° C., and a solvent mixture comprising of Hexane: Dichloromethane (DCM): Methanol in a 5:2:1 ratio was used for the extraction. The pump flow rate was set to 1.2 mL/min. The solvent was added to the channels sequentially in one minute intervals. The extraction was pursued for 30 minutes in one experiment and for 20 minutes in a second experiment. The nitrogen purge used was 2 minutes for each cell. Excellent recovery was established in this approach for both experiments as shown in Table 8 below. The present approach is far superior to the approach of Example 7 as evidenced here by the superior near 100% recovery. Not only was the recovery increased at 30 minute extraction time, but it also improved at a shorter extraction time of 20 minutes. The improved recovery % in this Example was a surprising result since the solvent volume and total extraction time was the same as Example 7. Applicant believes that the improved recovery % can be ascribed to the introduction of the static extraction time of one minute for each cycle ((2−1)×1).

TABLE 8

| Solvent flow rate, mL/min | Extraction time, min | Mode | Parallel samples | Lipid recovery, % | Solvent collected, mL |
|---|---|---|---|---|---|
| 1.2 | 30 | Parallel in intermittent flow, switch mode | Sample-1 | 100.5 | 17 |
|  | 30 |  | Sample-2 | 100.3 | 17 |
| 1.2 | 20 | Parallel in intermittent flow, switch mode | Sample-1 | 100.0 | 11 |
|  | 20 |  | Sample-2 | 100.3 | 11 |

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An accelerated solvent extraction apparatus, the apparatus comprising:
   a plurality of extraction channels in parallel with one another, each extraction channel including a solvent column fluidly connected to a sample column, and a flow restrictor configured to maintain a backpressure within the sample column;
   a temperature controlled zone for maintaining the plurality of extraction channels at a predetermined temperature;
   a plurality of collection vessels, each fluidly coupled to a respective extraction channel via a respective flow restrictor;
   a liquid solvent pump for supplying extraction solvent to the plurality of extraction channels; and
   a switching valve having a single inlet port in fluid communication with the liquid solvent pump and having a plurality of different outlet ports, each one of the plurality of different outlet ports being in fluid communication with a different extraction channel, the switching valve configured to operate in each of a plurality of different operating configurations, in a predetermined sequence during a switching cycle, each different operating configuration in the predetermined sequence providing fluid communication between the inlet port and only one of the different outlet ports for directing an aliquot of the extraction solvent flowing from the solvent pump to the extraction channel that is in fluid communication with the one of the different outlet ports during a respective segment of the switching cycle, the switching valve configured to direct extraction fluid to no more than one of the plurality of extraction channels at a time,
   wherein during use the switching valve is controlled through a plurality of sequential switching cycles, and wherein during every switching cycle of the plurality of sequential switching cycles each extraction channel receives one aliquot of the extraction solvent during its respective segment of the cycle, and wherein the flow restrictor is a restrictor tube providing constant fluid communication between respective ones of the sample columns and the collection vessels, and a valve configured to open and close is not in continuous fluid communication between respective ones of the sample columns and the collection vessels.

2. An accelerated solvent extraction apparatus according to claim 1, wherein the temperature controlled zone is a water bath.

3. An accelerated solvent extraction apparatus according to claim 1, wherein the temperature controlled zone is an oven assembly.

4. An accelerated solvent extraction apparatus according to claim 1, wherein the temperature controlled zone includes a dedicated control zone for each extraction channel.

5. An accelerated solvent extraction apparatus according to claim 1, wherein the temperature controlled zone is configured to maintain the plurality of extraction channels at 100° C.

6. An accelerated solvent extraction apparatus according to claim 1, wherein the solvent pump is configured to operate at 1500 psi or more.

7. An accelerated solvent extraction apparatus according to claim 1, wherein the switching valve is a multi-port valve or a multi-position valve.

8. An accelerated solvent extraction apparatus according to claim 7, wherein the switching valve is a six-port valve or a ten-port valve.

9. An accelerated solvent extraction apparatus according to claim 7, wherein the switching valve is a six-position valve or a ten-position valve.

10. A method for accelerated solvent extraction, the method comprising:
providing a plurality of extraction channels in parallel with one another, each extraction channel including a solvent column fluidly connected to a sample column;
providing a plurality of samples, comprising placing each sample in a respective one of the sample columns;
maintaining an operating temperature of the plurality of extraction channels at a predetermined temperature; and
supplying liquid extraction solvent to each one of the plurality of extraction channels in a time-sequenced fashion during a plurality of cycles, comprising;
during each one of the plurality of cycles, sequentially directing an aliquot of the liquid extraction solvent from a solvent pump to each one of the plurality of extraction channels, each extraction channel receiving its respective aliquot during a respective segment of each of the plurality of cycles, wherein the order of the respective segments is the same during each one of the plurality of cycles, and wherein the duration of each segment of each one of the plurality of cycles is the same, and
for each extraction channel, providing a plurality of static extraction times, each static extraction time being provided between directing the aliquots of the liquid extraction solvent to said each extraction channel during adjacent cycles of the plurality of cycles,
wherein the plurality of cycles comprises at least three cycles, and wherein the plurality of static extraction times comprises at least two static extraction times for each extraction channel, and wherein analyte recovery from each sample is at least 98%, and collecting the liquid extraction solvent containing the analyte in a plurality of collection vessels, each one of the plurality of collection vessels being in fluid communication with a respective extraction channel via a flow restrictor, wherein the flow restrictor is a restrictor tube providing constant fluid communication between respective ones of the sample columns and the collection vessels.

11. A method for accelerated solvent extraction according to claim 10, wherein the temperature controlled zone maintains the extraction channels at 100° C.

12. A method for accelerated solvent extraction according to claim 10, wherein a flow restrictor provides constant fluid communication between respective ones of the extraction channels to a corresponding plurality of collection vessels.

13. A method for accelerated solvent extraction according to claim 10, wherein the supplying extraction solvent step is accomplished with a liquid solvent pump.

14. A method for accelerated solvent extraction according to claim 13, wherein the liquid solvent pump operates at 1500 psi or more.

15. A method for accelerated solvent extraction according to claim 10, wherein the sequentially directing extraction solvent step is accomplished with a switching valve.

16. A method for accelerated solvent extraction according to claim 15, wherein the switching valve is automatically controlled to sequentially switch between the plurality of extraction channels.

17. A method for accelerated solvent extraction according to claim 10, wherein each aliquot contains substantially a same volume of the liquid extraction solvent.

18. An accelerated solvent extraction apparatus according to claim 1, wherein each solvent column has an internal volume that is greater than an internal volume of the sample column in fluid communication therewith.

19. A method for accelerated solvent extraction according to claim 10, wherein during each static extraction time the liquid extraction solvent does not flow within the respective extraction channel.

20. An accelerated solvent extraction apparatus, the apparatus comprising:
a plurality of extraction channels disposed in parallel with one another, each extraction channel including a solvent column fluidly connected to a sample column, and a flow restrictor configured to maintain a backpressure within the sample column;
a temperature controlled zone for maintaining the plurality of extraction channels at a predetermined temperature;
a plurality of collection vessels, each fluidly coupled to a respective extraction channel via a respective flow restrictor;
a liquid solvent pump for supplying extraction solvent to the plurality of extraction channels; and a multi-port or a multi-position switching valve having a single inlet port in fluid communication with the liquid solvent pump, a plurality of outlet ports each of which is in fluid communication with a different extraction channel of the plurality of extraction channels, and at least a conduit configured to provide fluid communication between the inlet port and only one outlet port of the plurality of outlet ports at a time, the at least a conduit being switchable between a plurality of different orientations in a predetermined sequence of a switching cycle, each different orientation providing fluid communication between the inlet port and a different outlet port of the plurality of outlet ports, wherein during use the switching valve is controlled through a plurality of sequential switching cycles, and wherein during every switching cycle of the plurality of sequential switching cycles each extraction channel receives one aliquot of the extraction solvent during a respective segment of the switching cycle, and wherein the flow restrictor is a restrictor tube providing constant fluid communication between respective ones of the sample columns and the collection vessels, and a valve configured to open and close is not in continuous fluid communication between respective ones of the sample columns and the collection vessels.

21. A method for accelerated solvent extraction according to claim 10, wherein the analyte is a lipid.

22. A method for accelerated solvent extraction according to claim 10, wherein a total volume of liquid extraction solvent used per extraction channel is less than an amount of liquid extraction solvent that is required per extraction channel to achieve 98% analyte recovery with a continuous flow of the liquid extraction solvent.

23. An accelerated solvent extraction apparatus according to claim 1, wherein the restrictor tube has a first end that is connected to the collection vessel and a second end that is connected to an outlet of the sample column of the respective extraction channel.

24. A method according to claim 10, wherein the restrictor tube has a first end that is connected to the collection vessel and a second end that is connected to an outlet of the sample column of the respective extraction channel.

25. An accelerated solvent extraction apparatus according to claim 20, wherein the restrictor tube has a first end that is connected to the collection vessel and a second end that is connected to an outlet of the sample column of the respective extraction channel.

* * * * *